United States Patent
Seguin

(10) Patent No.: US 7,206,295 B2
(45) Date of Patent: Apr. 17, 2007

(54) DATA TRANSMISSION METHOD COMBATING DEGRADATION OF THE QUALITY OF SERVICE

(75) Inventor: Laure Seguin, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 699 days.

(21) Appl. No.: 09/824,772

(22) Filed: Apr. 4, 2001

(65) Prior Publication Data
US 2002/0021714 A1 Feb. 21, 2002

(30) Foreign Application Priority Data
May 25, 2000 (FR) .................................. 00 06804

(51) Int. Cl.
*H04Q 7/00* (2006.01)
(52) U.S. Cl. ...................................... 370/328; 370/469
(58) Field of Classification Search ................ 370/277, 370/317, 318, 319, 328, 332, 333, 335, 338, 370/441, 468, 470, 472, 477
See application file for complete search history.

(56) References Cited

U.S. PATENT DOCUMENTS

| | | | | |
|---|---|---|---|---|
| 6,341,224 B1 * | 1/2002 | Dohi et al. | .................. | 455/522 |
| 6,473,399 B1 * | 10/2002 | Johansson et al. | .......... | 370/229 |
| 6,473,442 B1 * | 10/2002 | Lundsjo et al. | ............. | 370/537 |
| 6,477,670 B1 * | 11/2002 | Ahmadvand | ................ | 370/278 |
| 6,618,591 B1 * | 9/2003 | Kalliokulju et al. | ........ | 370/468 |
| 2001/0033582 A1 * | 10/2001 | Sarkkinen et al. | .......... | 370/474 |
| 2004/0057460 A1 * | 3/2004 | Hwang | ....................... | 370/468 |

FOREIGN PATENT DOCUMENTS

| | | |
|---|---|---|
| EP | 0 991 218 | 4/2000 |
| WO | WO 00/21253 | 4/2000 |

OTHER PUBLICATIONS

P. Lettieri, et al., IEEE, XP-000852037, pp. 564-571, "Adaptive Frame Length Control for Improving Wireless Link Throughput, Range, and Energy Efficiency", Mar. 29, 1998.
3G TS 25.301 version 3.3.0, XP-002164238, pp. 1-48, "3rd Generation Partnership Project; Technical Specification Group Radio Access Network; Radio Interface Protocol Architecture", Dec. 1999.
P. Lettieri, et al., IEEE, pp. 564-571, "Adaptive Frame Length Control for Improving Wireless Link Throughput, Range, and Energy Efficiency", 1998.

* cited by examiner

*Primary Examiner*—Chi Pham
*Assistant Examiner*—Anh-Vu Ly
(74) *Attorney, Agent, or Firm*—Oblon, Spivak, McClelland, Maier & Neustadt, P.C.

(57) ABSTRACT

A system for transmitting data over a physical resource including a layer configured to manage the physical resource and to guarantee a quality of service, and a first sub-layer configured to supply a transmission support in accordance with the quality of service and to segment the data into transmission units. The first sub-layer reduces a size of at least one of the transmission units when transmission conditions on the physical resource are degraded. A second sub-layer is configured to transmit at least one of the transmission units over the physical resource during each of transmission time intervals. The transmission time interval is a periodic time interval during which the second sub-layer is allowed to access the physical resource. A physical layer is configured to perform error correction coding or decoding of the data.

24 Claims, 4 Drawing Sheets

DATA TRANSMISSION METHOD COMBATING DEGRADATION OF THE QUALITY OF SERVICE

BACKGROUND OF THE INVENTION

The present invention concerns in general terms a method of transmitting data over a physical resource. More precisely the present invention concerns a transmission method combating the degradation of the quality of service in a mobile telecommunications system.

Such a system consists of one or more receivers connected to one or more transmitters by radio links. The transmission capacity of such a system is limited by the noise level, the interference between the signals of the different users, the available bandwidth etc. It must therefore be shared between the different users according to a resource allocation process enabling each user to have available as far as possible the services which he has requested.

For this purpose, a mobile telecommunication system uses three protocol layers as depicted in FIG. 1.

The upper layer or RRC (Radio Resource Control) layer is responsible for managing the whole of the physical resource and guaranteeing the quality of service (QoS) for the services of the different users. The quality of services defines in particular the maximum routing time and the error rate of the service data units, also referred to as SDUs.

The layer 2 is divided into an RLC (Radio Link Control) sub-layer and an MAC (Medium Access Control) sub-layer.

The RLC sub-layer is responsible for supplying, to the different applications, a transmission support in accordance with the quality of service guaranteed by the RRC layer. The RLC sub-layer can operate according to different modes. The first, so called transparent, mode (TM) is itself divided into two sub-modes. According to the first sub-mode, the RLC can segment the SDUs in order to generate data packets or transmission units known as RLC PDUs (RLC Protocol Data Units). According to a second sub-mode, this segmentation is not enabled and an RLC PDU must correspond to an SDU. In a second mode, known as unacknowledged mode (UM), it can not only segment the SDUs but also concatenate the fragments thereof in order to generate the RLC PDUs. In a third mode, known as acknowledged mode (AM), it can also request the retransmission of the erroneous RLC PDUs. In particular, when it is functioning in acknowledged mode, the RLC layer is responsible for the retransmission of the erroneous units in which the errors have not been able to be corrected by the physical processing. This retransmission is effected once again in the form of RLC PDU (re)transmission units.

The structure of an RLC PDU is illustrated in FIG. 2. It is in the form of a packet comprising a useful load consisting of service data coming from one or more SDUs (according to the operating mode of the RLC sub-layer), a header supplying the signalling information necessary to the RLC layer and an error detecting code (CRC) for detecting whether or not the packet is erroneous. In the majority of mobile telecommunication systems offering an acknowledged mode, the size of the RLC PDU transmission unit is fixed throughout the duration of the connection. This is the case in particular with the third-generation mobile telephony system (UMTS) as specified in the 1999 version of the standard.

The MAC sub-layer is responsible for access to the shared physical resource. If a user wishes to have several services available simultaneously, the MAC sub-layer distributes these services over the resource reserved by the RRC layer. Access to the resource is divided into transmission time intervals (TTI). For a given service, the MAC sub-layer can send a number NP of packets, all of the same size TP, during a transmission time interval. However, the MAC sub-layer is not able to choose any values for NP and TP. The possible values of NP and TP are imposed by the RRC layer and only certain combinations of these values are authorised by the latter. The possible combinations are supplied by the RRC layer to the MAC sub-layer.

The layer 1 or physical layer PHY is responsible for the physical processing of the data. It includes in particular an error correcting coding/decoding function which enables it correct the major part of the errors affecting the data transmitted and to provide a low residual error rate to the upper layers. For example, in the UMTS system, the coding/decoding used for the services benefiting from the acknowledged mode of the RLC layer is a turbocoding/decoding. The processing unit of the physical layer being the transmission time interval TTI, the data in the packets to be transmitted are interleaved within this interval, which results in a uniform distribution of the residual errors over the duration of the TTI.

In a mobile telecommunication system of the code distribution multiple access (CDMA) type such as that of the UMTS, the transmission powers of each of the signals transmitted (by the base stations or by the mobiles) must be adjusted so that the level of the signal to noise ratio plus interference attains the level required by the quality of service. For a given receiver, the signal to noise ratio plus interference is defined as being equal to the ratio between the signal level received and the background noise level plus the level of total interference received.

However, as the transmission powers are limited, it may happen that the resource allocation system cannot guarantee the quality of service by increasing the transmission power of the corresponding signal. In such a case, the bit error rate increases substantially and the residual error rate on the packets (BLER) may exceed an acceptable threshold. Since each erroneous packet gives rise to a retransmission request, the effective transmission rate then tends towards zero.

In order to deal with such a congestion phenomenon, various solutions have been proposed such as that of blocking certain calls or greatly reducing the transmission rate of some transmitters. These solutions are however not satisfactory since they do not guarantee that the data routing time does not exceed the maximum time fixed by the quality of service.

BRIEF SUMMARY OF THE INVENTION

The purpose of the present invention is to remedy the aforementioned drawbacks and in particular to propose a transmission method which guarantees a transmission rate for a service in spite of the degradation of the transmission conditions, even if it is no longer possible to increase the transmission power of the signal supporting the said service.

To this end, the transmission method according to the invention is characterised in that the size of the RLC PDU transmission units is reduced when the transmission conditions are degraded.

According to a first embodiment of the invention, the RRC layer determines, at the start of a connection, a plurality of possible transmission unit sizes for a given transmission time interval, and the RLC sub-layer selects, from amongst this plurality, a transmission unit size according to the transmission conditions, a smaller size being selected in the event of degradation of the transmission conditions.

According to a second embodiment of the invention, the layer (RRC) fixes a transmission unit size at the start of a connection according to the transmission conditions. In the case of degradation of the transmission conditions, the RRC layer of the network initiates a procedure for changing the transmission size.

Other embodiments of the invention are given by the dependent claims.

The present invention also concerns a UMTS telecommunication system using the above mentioned transmission method.

BRIEF DESCRIPTION OF THE SEVERAL VIEW OF THE DRAWINGS

The characteristics of the invention mentioned above, as well as others, will emerge more clearly from a reading of the description given in relation to the accompanying drawings, amongst which:

DETAILED DESCRIPTION OF THE INVENTION

The transmission method according to the invention proposes to reduce the size of the transmission unit of the RLC sub-layer when the transmission conditions are degraded. According to a first embodiment of the invention the size of the transmission unit is chosen by the MAC sub-layer from amongst a set of possible sizes. According to a second embodiment the change in size of the transmission unit routinely causes the RRC layer to be involved.

In general terms the size of the RLC PDU transmission unit is not chosen arbitrarily. This is because, for a given error rate (BER), transmission time interval (TTI) and bit rate, it can be shown that there is an optimum size of the RLC PDU. The residual errors, that is to say the errors not corrected by the error correcting decoding of the physical layer, being distributed uniformly over the length of the TTI, the probability that an RLC PDU is not erroneous is an exponentially decreasing function of its size L. An RLC PDU contains L−ovhd useful bits, where ovhd is the total size of the header and CRC code. The effective transmission rate is therefore, as a first approximation, proportional to (L−ovhd)/L* exp(−L*BER). If the size L of the transmission unit is small, the effective transmission rate is low since the number of useful bits is itself small. Likewise, if the size L is too great the effective transmission rate is low because of the high probability of loss in the RLC PDUs.

Figure 1:
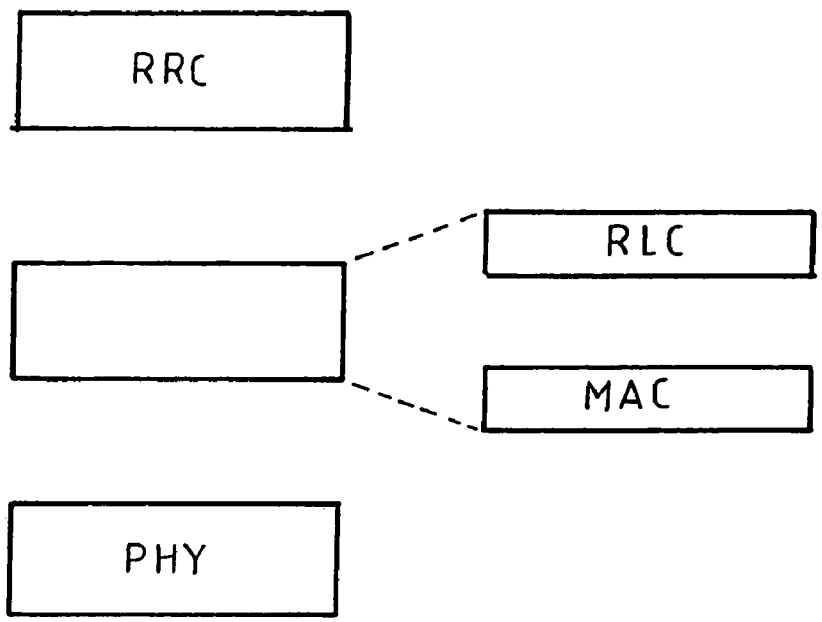
FIG. 1 depicts the protocol layers used by a mobile telecommunication system.
Figure 2:
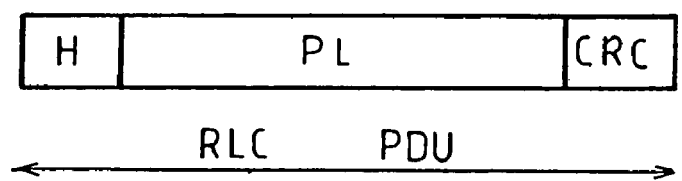
FIG. 2 depicts the structure of a transmission unit of the RLC layer.
Figure 3:
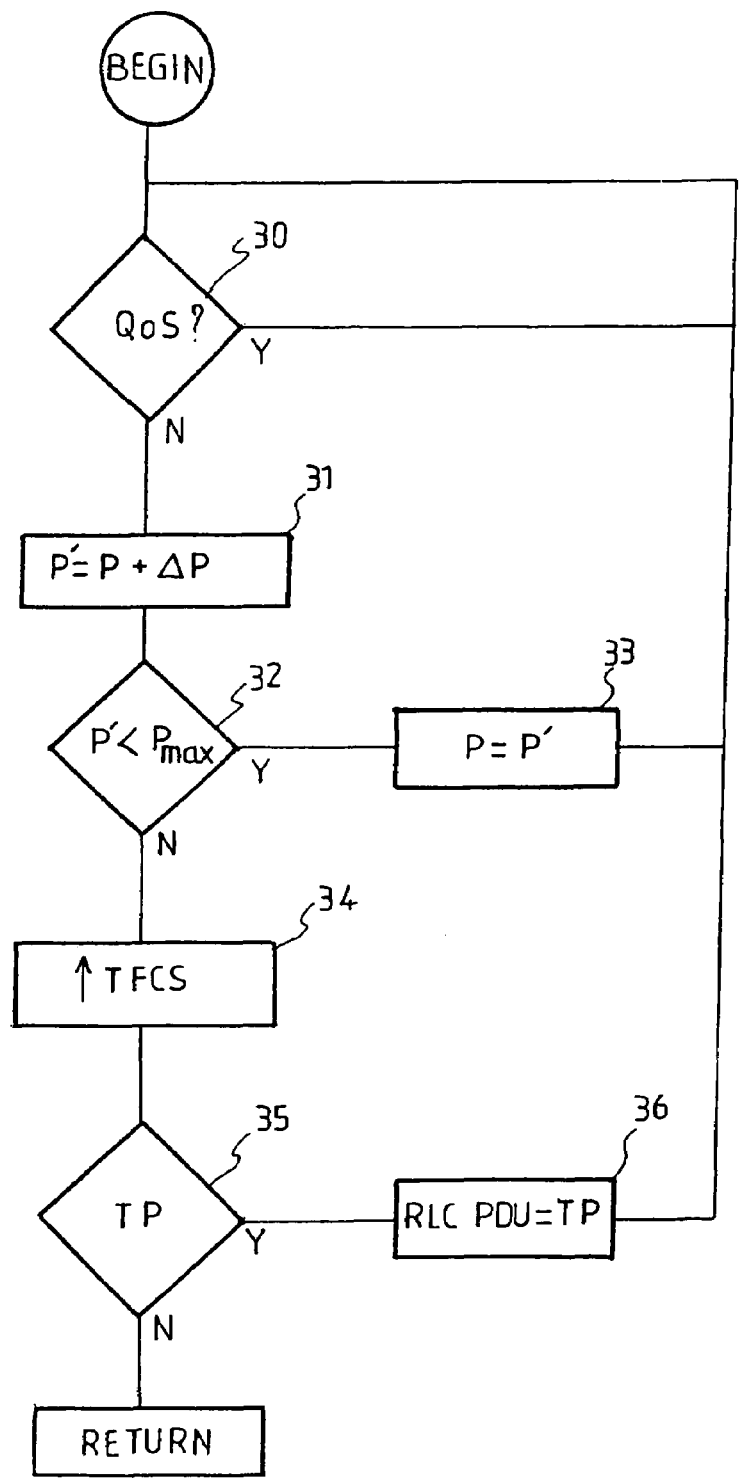
FIG. 3 depicts schematically a first embodiment of the invention.

FIG. 3 depicts schematically a transmission method according to the first embodiment.

When a connection is established, the RRC layer supplies to the MAC sub-layer a set of possible sizes for the RLC PDU transmission unit. More precisely, if the mobile telecommunication system is a UMTS system, the RRC layer supplies to the MAC sub-layer on the one hand one TFS (Transport Format Set) table per transport channel and on the other hand a TFCS (Transport Format Combination Set) table relating to all the transport channels which the said sub-layer can use. A TFS table relating to a transport channel consists of a set of pairs $(TP_j, N_j)_{j=1 \ldots n}$ where $TP_j$ is a possible size of the RLC PDU for this channel, $N_j$ is the number of RLC PDUs associated with this size which the MAC sub-layer can transmit in a time interval TTI and n the number of possible pairs on this channel. The TFCS table relates to all the transport channels and comprises a plurality of combinations $TFC_i$ of possible transport formats, each combination $TFC_i$ consisting of a set of pairs $\{(TP_{1,i}, N_{1,i}), \ldots (TP_{k,i}, N_{k,i}), \ldots (TP_{m,i}, N_{m,i})\}$ where m is the set of usable channels and where a pair $(TP_{k,i}, N_{k,i})$ belongs to a TFS table of the channel k. The TFCS table therefore describes in particular the possible combinations of sizes of RLC PDUs for all the transport channels, a combination being able to be selected at each time interval TTI by the MAC sub-layer. The combination selected by the MAC sub-layer is marked by a TFCI pointer in the TFCS table. This pointer is transmitted to the receiver with each physical frame (10 ms) on the DPCCH control channel.

Firstly (30) the MAC sub-layer of the transmitter checks whether the required quality of service (QoS) is indeed complied with by comparing the error rate per RLC PDU with a threshold value. The error rate can be obtained for example from status reports sent by the receiver. Alternatively, compliance with the quality of service can be checked from the convergence of the closed loop power check. This is because in the UMTS system each transmission frame is divided into slots corresponding to a period (0.625 ms) of checking the transmission power. The receiver indicates (31) at each slot whether the transmitter must increase or decrease its power in order to attain the set level $SIR_t$ fixed by the RRC layer. If the maximum power is reached (32) and the power check requests a further increase in the transmission power, this means that the set level cannot be attained and therefore that the quality of service is no longer complied with.

As long as the maximum power is not reached (32), the instructions of the power control loop are followed (33). On the other hand, if this power is reached and therefore the quality of service is not complied with, the MAC sub-layer seeks (34) in the TFCS table the size TP of the RLC PDU less than the current size and the combination (TP, N) which corresponds to a rate equivalent to the current one $(TP_2*N_2=TP_1*N_1)$. If this combination exists (35), the size of the RLC PDU is fixed at the corresponding new size (36).

The TFCS table being determined at the start of the connection and known both to the transmitter and to the receiver, the combination pointer TFCI also being transmitted at each interval TTI, the change in size does not require any exchange of information between the transmitter and the receiver nor any additional signalling during connection.

Advantageously, the size of the RLC PDU will be changed only after having found that the situation of non-compliance with the quality of service persists beyond a predetermined period of tolerance, in order to avoid unwanted changes.

Advantageously, the TFS table will include only two sizes of RLC PDU: a first size corresponding to normal transmission conditions on the channel and a second size corresponding to crisis situations. This second size can be determined empirically according to the average of the error rates BER observed during the occurrence of these situations.

Figure 4:
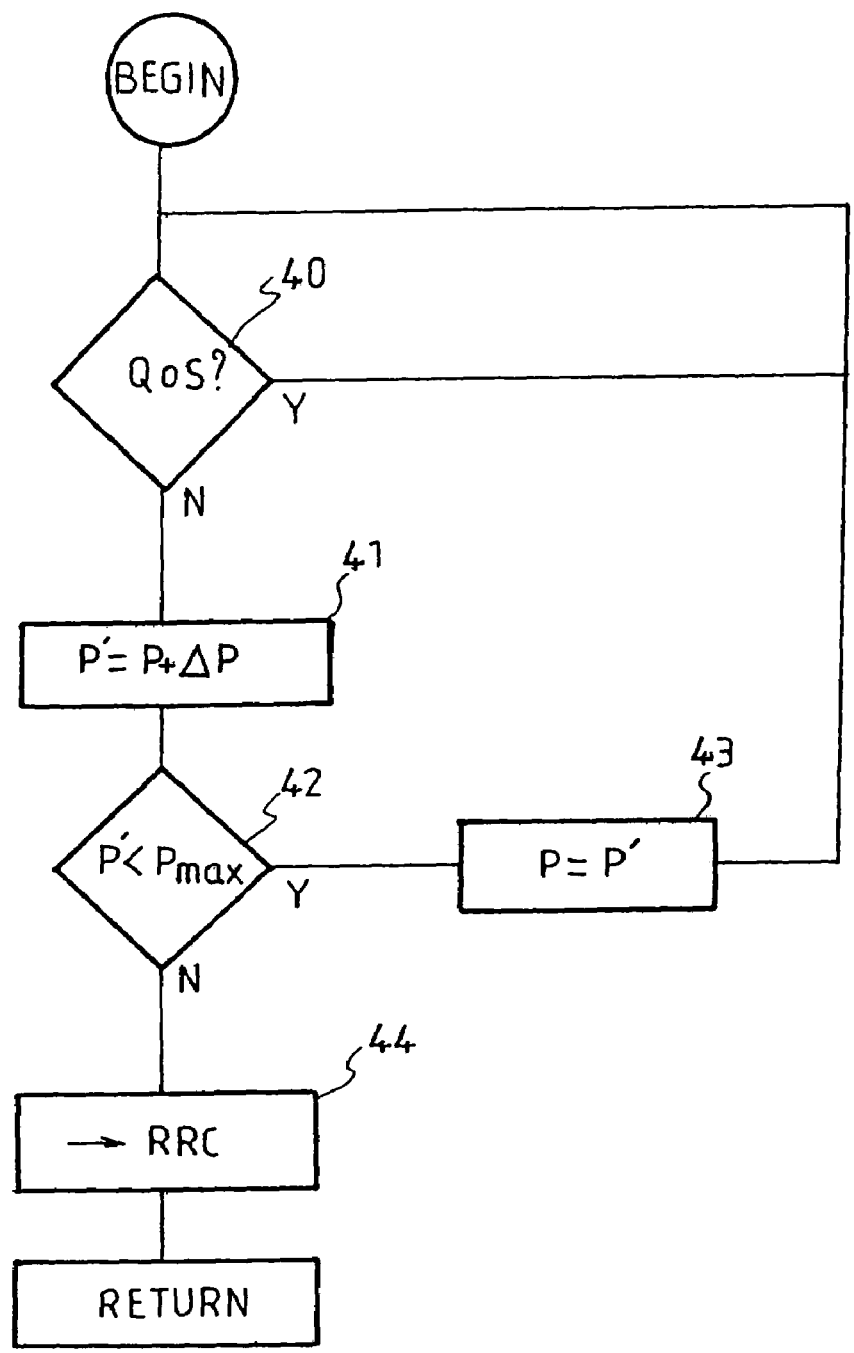
FIG. 4 depicts schematically a second embodiment of the invention.

FIG. 4 depicts schematically a transmission method according to a second embodiment.

According to this embodiment, the size of the RLC PDU is fixed at the start of connection by the RRC layer. The RLC and MAC sub-layers are then configured according to this size.

Unlike the first embodiment, the RLC sub-layer functions with only one size of PDU. The procedure of changing the size of the RLC PDU requires the action of the RRC layer of the network, whether this is functioning as a transmitter or as a receiver.

Firstly (40), the network checks whether the quality of service (QoS) required is indeed complied with by comparing the error rate per RLC PDU with a threshold value. If the network is functioning as a transmitter, the error rate will be supplied as before by the status reports sent by the receiver. If the network is functioning as a receiver, the error rate will be supplied by the RLC sub-layer of the network. Alternatively, compliance with the quality of service is verified from the convergence of the closed loop power check. If the network is functioning as a transmitter and the mobile terminal requests an increase in power (41) whereas the maximum power is already achieved, the quality of service can no longer be complied with. Likewise, if the network is functioning as a receiver and the mobile terminal has reached its maximum transmission power, the network will be warned of this by a measurement report sent by the terminal.

Figure 5:
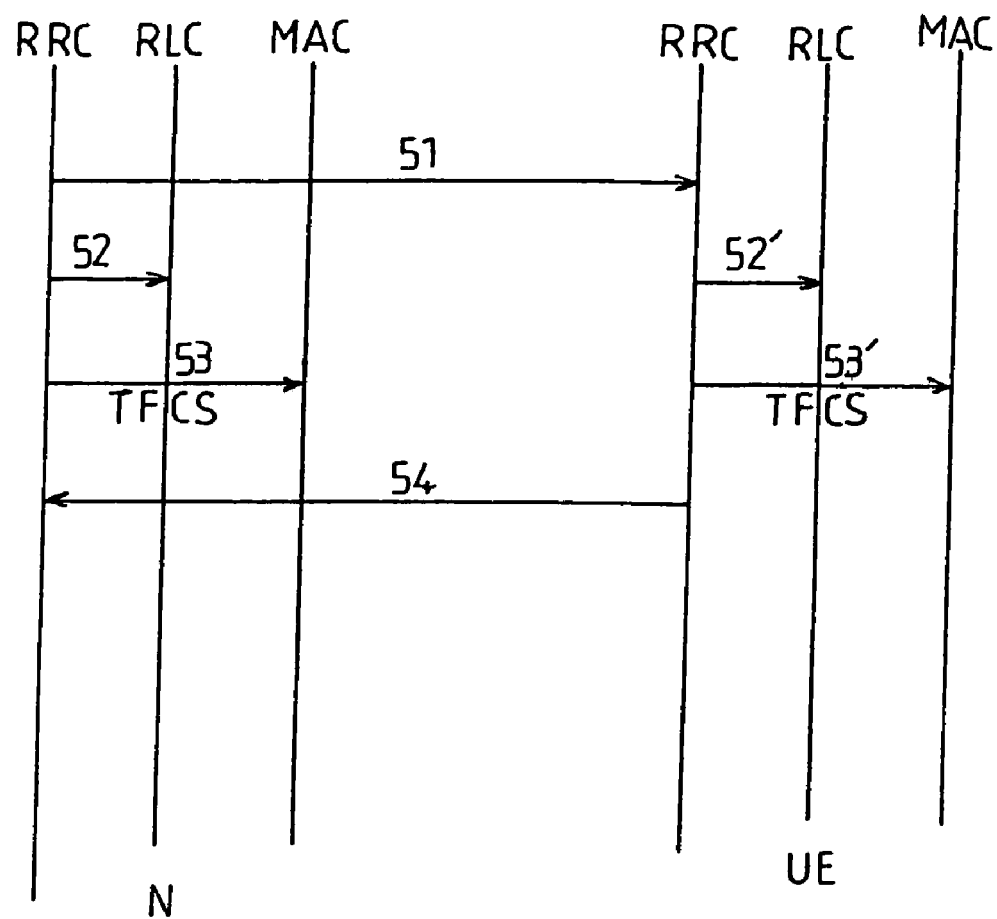
FIG. 5 depicts schematically a procedure for changing the size of the RLC PDU useful for implementing the second embodiment of the invention.

In both cases, if the maximum power (42) is reached and an increase in the transmission power would be necessary to maintain the service quality, the procedure of changing the size of the RLC PDU is initiated (44). This procedure is illustrated in FIG. 5.

Firstly, the RRC layer of the network (N) sends a reconfiguration instruction (51) to the RRC layer of the mobile terminal (UE). The RLC and MAC sub-layers of the transmitter and receiver are then respectively configured (52, 52', 53, 53') in order to conform to this new size. After reconfiguration, the RRC layer of the terminal sends (54) an acknowledgement message to the RRC layer of the network. If the mobile telecommunication system is a UMTS system, the MAC sub-layers receive from the RRC layers a new TFCS table giving the new possible transport format combinations. These new combinations will indicate the new size of RLC PDU which the MAC sub-layer can use.

Let it be assumed for example that there are three transport channels with the same TFS:{(320,2); (320,4); (320,6); (640,1); (640,2); (640,3)} and that before configuration we have the following TFCS table:

TFCS: {TFC$_i$} with TFC$_i$: {(TP$_{1,i}$,NP$_{1,i}$); (TP$_{2,i}$, NP$_{2,i}$); (TP$_{3,i}$,NP$_{3,i}$)} where TP$_{1,i}$=640 for i=1 . . . m. Thus, for channel 1, only the RLC PDU size of 640 bits is used. If the quality of service is not complied with, the RRC layer of the network will initiate a reconfiguration procedure and will send a new TFCS table to the MAC sub-layer with TP'$_{1,i}$= 320 and NP'$_{1,i}$=2*NP$_{1,i}$.

The method according to the first or second embodiment applies to the services using the RLC layer according to a mode allowing segmentation. As seen above, this will be the case for the acknowledged and unacknowledged modes and for the first sub-mode of the transparent mode. Advantageously, the method will apply to services using the acknowledged mode of the RLC layer. In fact, for these services, the routing time for the data is not of vital importance and the method described will enable them to keep a non-zero transmission rate in the event of congestion and to comply with the required quality of service.

Finally, the method according to the second embodiment can be used as an indirect resource allocation method. This is because, if the RRC layer of the network deliberately reduces the set level SIR$_t$ of the low-priority services, services which can accommodate a reduction in resources and for which the data routing time has only low importance, it will cause a degradation in the transmission conditions for these services, a degradation which will be followed by a reduction in the size of the RLC PDU. By thus acting on the set value it will be able indirectly to modulate the resources granted to these services.

The invention claimed is:

1. A system for transmitting data over a physical resource, comprising:
    a first layer configured to manage the physical resource and to guarantee a quality of service;
    a first sub-layer configured to supply a transmission support in accordance with the quality of service and to segment the data into transmission units, the first sub-layer reducing a size of at least one of the transmission units when transmission conditions on the physical resource are degraded;
    a second sub-layer configured to transmit at least one of the transmission units over the physical resource during each of transmission time intervals, the transmission time interval being a periodic time interval during which the second sub-layer is allowed to access the physical resource; and
    a physical layer configured to perform error correction coding or decoding of the data, wherein
    the first layer guarantees the quality of service by assigning a set level to the ratio of received signal power to noise plus interference,
    in the case of degradation of the transmission conditions the transmission power of a transmitter is increased so as to maintain the quality of service, and
    the size of each of the transmission units is reduced when the transmission power reaches a maximum value.

2. The system of claim 1, wherein access to the physical resource is divided into the transmission time intervals, and wherein the second sub-layer is configured to cheek whether the quality of service has been complied with.

3. The system of claim 2, wherein the first sub-layer determines a plurality of sizes of the transmission units for the transmission time intervals and the second sub-layer selects one of the plurality of sizes according to the transmission conditions, the second sub-layer selecting a smaller one of the plurality of sizes when the transmission conditions on the physical resource are degraded.

4. The system of claim 3, wherein the first sub-layer supplies to the second sub-layer the plurality of sizes by means of a table.

5. The system of claim 3 wherein the first layer is configured to retransmit the transmission units if acknowledgement is not received.

6. The system of claim 2, wherein the first sub-layer adjusts the size of each of the transmission units according to the transmission conditions and transmits the size adjusted to the second sub-layer.

7. The system of claim 6, wherein the first sub-layer reduces the size of each of the transmission units when the transmission conditions on the physical resource are degraded.

8. The system of claim 7, wherein the first sub-layer adjusts the plurality of sizes of the transmission units by sending a table to the second sub-layer.

9. The system of claim 7 wherein the first layer is configured to retransmit the transmission units if acknowledgement is not received.

10. The system of claim 6 wherein the first layer is configured to retransmit the transmission units if acknowledgement is not received.

11. The system of claim 2 wherein the first layer is configured to retransmit the transmission units if acknowledgement is not received.

12. The system of claim 1 wherein the system is a UMTS mobile telephony system.

13. The system of claim 1, wherein the first layer allocates resources by reducing the set level of a low-priority service.

14. The system of claim 13 wherein the first layer is configured to retransmit the transmission units if acknowledgement is not received.

15. The system of claim 1 wherein the first layer is configured to retransmit the transmission units if acknowledgement is not received.

16. A system for transmitting data over a physical resource, comprising:
  a first layer configured to manage the physical resource and to guarantee a quality of service;
  a first sub-layer configured to supply a transmission support in accordance with the quality of service and to segment the data into transmission units, the first sub-layer reducing a size of at least one of the transmission units when transmission conditions on the physical resource are degraded;
  a second sub-layer configured to transmit at least one of the transmission units over the physical resource during each of transmission time intervals, the transmission time interval being a periodic time interval during which the second sub-layer is allowed to access the physical resource; and
  a physical layer configured to perform error correction coding or decoding of the data,
  wherein the first sub-layer adjusts the size of each of the transmission units according to the transmission conditions and transmits the size adjusted to the second sub-layer,
  wherein
  the first layer guarantees the quality of service by assigning a set level to the ratio of received signal power to noise plus interference,
  in the case of degradation of the transmission conditions the transmission power of a transmitter is increased so as to maintain the quality of service, and
  the size of each of the transmission units is reduced when the transmission power reaches a maximum value.

17. The system of claim 16, wherein the first layer allocates resources by reducing the set level of a low-priority service.

18. The system of claim 17 wherein the first layer is configured to retransmit the transmission units if acknowledgement is not received.

19. The system of claim 16 wherein the first layer is configured to retransmit the transmission units if acknowledgement is not received.

20. A system for transmitting data over a physical resource, comprising:
  a first layer configured to manage the physical resource and to guarantee a quality of service;
  a first sub-layer configured to supply a transmission support in accordance with the quality of service and to segment the data into transmission units, the first sub-layer reducing a size of at least one of the transmission units when transmission conditions on the physical resource are degraded;
  a second sub-layer configured to transmit at least one of the transmission units over the physical resource during each of transmission time intervals, the transmission time interval being a periodic time interval during which the second sub-layer is allowed to access the physical resource; and
  a physical layer configured to perform error correction coding or decoding of the data,
  wherein the first layer guarantees the quality of service by assigning a set level to the ratio of received signal power to noise plus interference,
  in the case of degradation of the transmission conditions the transmission power of a transmitter is increased so as to maintain the quality of service, and
  wherein the first layer allocates resources by reducing the set level of a low-priority service.

21. The system of claim 20 wherein the first layer is configured to retransmit the transmission units if acknowledgement is not received.

22. The system of claim 20, wherein the first sub-layer determines a plurality of sizes of the transmission units for the transmission time intervals and the second sub-layer selects one of the plurality of sizes according to the transmission conditions, the second sub-layer selecting a smaller one of the plurality of sizes when the transmission conditions on the physical resource are degraded.

23. The system of claim 20, wherein the first sub-layer adjusts the size of each of the transmission units according to the transmission conditions and transmits the size adjusted to the second sub-layer.

24. The system of claim 23, wherein the first sub-layer reduces the size of each of the transmission units when the transmission conditions on the physical resource are degraded.

* * * * *